United States Patent
Carrier et al.

(10) Patent No.: US 9,183,596 B2
(45) Date of Patent: Nov. 10, 2015

(54) SYSTEM AND METHOD FOR MANAGING ACCESS RIGHTS TO A PROJECT TEAM AREA FOR A COMMUNITY DEVELOPMENT ASSET

(75) Inventors: Scott R. Carrier, Apex, NC (US); Helena S. Chapman, Wellesley, MA (US); John R. Hind, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2041 days.

(21) Appl. No.: 11/871,736

(22) Filed: Oct. 12, 2007

(65) Prior Publication Data

US 2009/0099895 A1  Apr. 16, 2009

(51) Int. Cl.
| | | |
|---|---|---|
| G06Q 99/00 | (2006.01) | |
| G06Q 50/00 | (2012.01) | |
| G06F 21/60 | (2013.01) | |
| G06Q 10/06 | (2012.01) | |
| G06Q 20/40 | (2012.01) | |

(52) U.S. Cl.
CPC .............. *G06Q 50/01* (2013.01); *G06F 21/604* (2013.01); *G06Q 10/06* (2013.01); *G06Q 20/401* (2013.01); *G06F 2221/2101* (2013.01)

(58) Field of Classification Search
USPC ................................................... 705/51, 319
See application file for complete search history.

(56) References Cited

U.S. PATENT DOCUMENTS

| | | | |
|---|---|---|---|
| 6,591,265 B1 * | 7/2003 | Erickson et al. ...................... 1/1 |
| 2002/0112171 A1 * | 8/2002 | Ginter et al. ................... 713/185 |
| 2006/0248573 A1 * | 11/2006 | Pannu et al. ...................... 726/1 |
| 2007/0113187 A1 * | 5/2007 | McMullen et al. ........... 715/742 |
| 2008/0141367 A1 * | 6/2008 | Ganz et al. ....................... 726/21 |
| 2008/0288596 A1 * | 11/2008 | Smith et al. ................... 709/206 |

* cited by examiner

*Primary Examiner* — Tsan-Yu J Huang
(74) *Attorney, Agent, or Firm* — Jeffrey T. Holman

(57) ABSTRACT

A system and method for managing access rights to a project team area for a community development asset. The system includes an asset consumption dependency generator and a behavior pattern activity analyzer. The asset consumption dependency generator identifies a member of a project team area for a community development asset. The project team area defines access rights of individuals to the community development asset. The behavior pattern activity analyzer identifies a user within a collaborative development network associated with the identified member of the project team area. The behavior pattern activity analyzer also grants an access right to the identified user to access the community development asset based on a social map dependency between the identified user and the identified member.

14 Claims, 6 Drawing Sheets

SYSTEM AND METHOD FOR MANAGING ACCESS RIGHTS TO A PROJECT TEAM AREA FOR A COMMUNITY DEVELOPMENT ASSET

BACKGROUND OF THE INVENTION

It is not unusual for distributed teams to work together virtually in a team space. Typical collaborative activities involve the development of a software asset, as well as consumption of the asset in a way that is cost effective. There are many social networking software programs and other tools that allow an asset provider and asset consumers to connect or collaborate through computer technology. Often, conventional collaboration takes place in more than one team area of the same project corresponding to the asset that is produced. For example, a project may use team room, a wiki, and a blog (or some other collaboration space) to reach out to the appropriate user community. Information about a software asset can be duplicated in all these places, and users may need to monitor all applicable communication channels to ensure the integrity of information published. The benefits of social networking tools sometimes also bring the challenges for users to identify which team areas are indeed worth close monitoring and which team areas only warrant casual engagement.

A social networking service is often a web based internet/intranet collaboration/information sharing service. The shared information is often accessible to the public. Additionally, other people with similar interests can view the information by category or tags of a folksonomy. Most conventional social networking services have algorithms to implement the concept of inference from the tag by examining the clustering of particular tags and, hence, finding relationship between one another. An important element in most of these services is the concept of a person's community, which means providing a way to rank query results based on the person's social network, which includes direct associates and more distant associates separated by degrees. Most of these conventional social networking services provide aggregate news feeds of places, filtered by tags, that a person's social network finds interesting. Many conventional social networking services also provide ways to attach comments and/or ratings to items indexed by the tags. It should be noted that the tags themselves also have a community, which includes the collection of people who use a tag to describe an object. Similarly, the objects also have a community, which includes the people who tag a particular object.

Given the successes of the open source software (OSS) approach to software development, many firms have started to apply the best practices of OSS to traditional closed-source development. An open collaborative development approach enables a single firm to leverage skills of all of its employees to benefit the entire organization, or at least a relatively large portion of the organization. With an open collaborative environment for development teams, harvesting software assets for reuse (e.g., in derivative applications) is facilitated and often encouraged.

Role based access control (RBAC) is a widely used approach in computer security systems to restrict collaborative access to only authorized users. Roles are typically associated with job functions in an organization. Specific roles are assigned permissions to perform specific operations. In general, specifying access rights based on roles is a good way to manage system security in the traditional software development world. However, while RBAC ensures that only authorized users are allowed to access certain types of information in a virtual collaboration community, the traditional RBAC approach is difficult to manage. Additionally, the traditional RBAC approach relies on constant oversight to determine and set up access rights for each individual. Also, access rights based solely on an individual's role may not be very effective since useful input is often desired from people who are not granted access rights to the collaborative environment. Additionally, in an open collaborative environment, individual RBAC is usually not sufficient because the potential community associated with the collaborative development asset is often far more comprehensive than including just a few people.

Furthermore, a person very often has more than one role for various projects. A predefined set of roles is usually not sufficient to satisfy all possible operational control. Frequently, a new custom role needs to be defined based on a particular scenario or else work cannot be performed. The conventional RBAC system also does not have the flexibility and automation to effectively manage a transition when a member of the team leaves a job, which entails administrative functions to remove that person's access. Additionally, removing one person's rights to access information due to a job change may end up locking out other related users from continuing to access the collaborative information.

SUMMARY OF THE INVENTION

Embodiments of a system are described. In one embodiment, the system is a system to manage access rights to a project team area for a community development asset. An embodiment of the system includes an asset consumption dependency generator and a behavior pattern activity analyzer. The asset consumption dependency generator identifies a member of a project team area for a community development asset. The project team area defines access rights of individuals to the community development asset. The behavior pattern activity analyzer identifies a user within a collaborative development network associated with the identified member of the project team area. The behavior pattern activity analyzer also grants an access right to the identified user to access the community development asset based on a social map dependency between the identified user and the identified member. Other embodiments of the system are also described.

Embodiments of an apparatus are also described. In one embodiment, the apparatus is a computer program product including a computer useable storage medium to store a computer readable program that, when executed on a computer, causes the computer to perform operations to dynamically manage access rights to a project team area for a community development asset. In an embodiment, the operations include an operation to identify a member of the project team area for the community development asset. The project team area defines access rights of individuals to the community development asset. The operations also include an operation to identify a user within a collaborative development network associated with the identified member of the project team area. The operations also include an operation to grant an access right to the identified user to access the community development asset based on a social map dependency between the identified user and the identified member. Other embodiments of the apparatus are also described.

Embodiments of a method are also described. In one embodiment, the method is a method for managing access rights to a project team area for a community development asset. An embodiment of the method includes identifying a member of a project team area for a community development asset. The project team area defines access rights of individuals to the community development asset. The method also includes identifying a user within a collaborative development network associated with the identified member of the project team area. The method also includes granting an access right to the identified user to access the community development asset based on a social map dependency between the identified user and the identified member of. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE SEVERAL VIEWS OF THE DRAWINGS

Throughout the description, similar reference numbers may be used to identify similar elements.

DETAILED DESCRIPTION OF THE INVENTION

Figure 1:
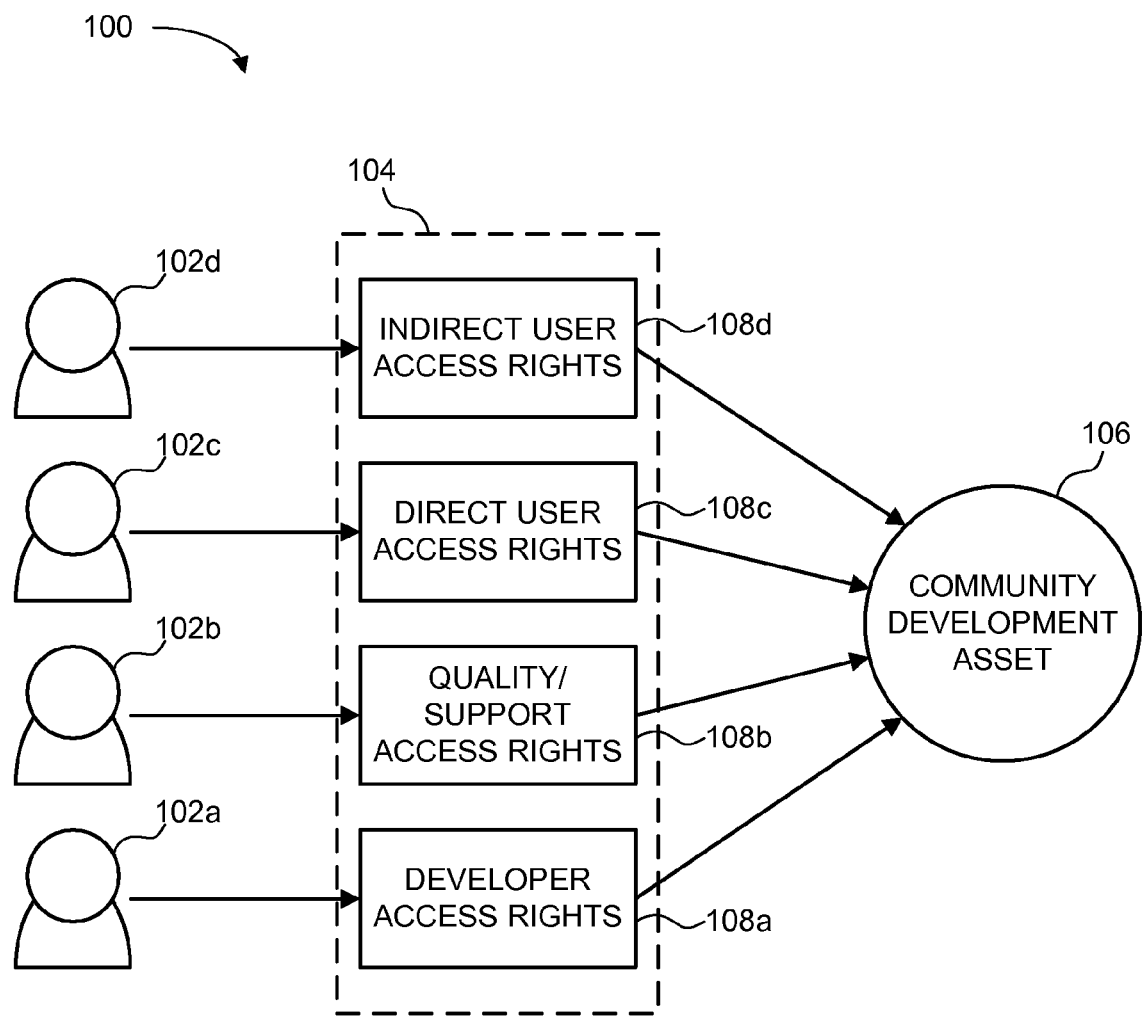
FIG. 1 depicts a schematic diagram of one embodiment of a collaborative development environment.

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments facilitate dynamically generating a team area that can be managed for a customary function. In other words, embodiments allow management of a closely-scoped team area with proper rights, obligations, and expected behavior patterns associated with a particular social status of a project. Since asset providers do not always know who the ultimate asset consumers are for a particular software asset or how the asset might be used, and conventional tools do not allow consumers at various levels of consumption to collaborate effectively, asset providers may not receive timely feedback from a consumer until something is broken or until the consumer identifies a feature that isn't included because it was not adequately communicated to the asset provider in a timely manner.

Accordingly, some embodiments described herein provide a tiered approach to map out the asset consumption dependency for a collaborative development asset (also referred to as a community development asset). Additionally, some embodiments foster a community based on a group of users defined by the collaboration behavior and activities of the users, rather than simply the assigned job roles of certain individuals. In this way, a well-designed team area for collaboration can save key stakeholders time and energy in effectively navigating computer-mediated communities without losing the valuable input of various interest parties. Moreover, an embodiment of the system described herein can generate and/or reuse a dynamic team area which automatically includes users based on the collaboration behavior patterns and social standing of each user. The system is described as focusing on usage behavior for software assets. However, other embodiments of the system may be implemented based on usage behaviors for other types of community assets.

Instead of using a traditional role based approach to grant access to a team area, a user is implicitly allowed to access information in a team area based on the user's behavior and activities in the collaboration. This can be a dynamically generated or pre-existing team area. To realize at least one implementation of the system, a collaborative development network (e.g. a company's community source program) is mined to define which individuals should be associated with a community development assets and to define the group and its access privilege to the corresponding dynamic team area. Additionally, other business process documentation (e.g., a company's clearing house) may be researched to identify dependency information that may be used to map out a dependency outline for the community development asset. Other embodiments are also described below with specific reference to the corresponding figures.

FIG. 1 depicts a schematic diagram of one embodiment of a collaborative development environment 100. The illustrated collaborative development environment 100 includes several users 102, including developers 102a, quality assurance and technical support users 102b, direct users or consumers 102c, and indirect users or consumers 102d. Each of these types of users 102 is given particular access rights within a defined project team area 104 for a corresponding community development asset 106. In particular, the developers 102a are given developer access rights 108a; the quality/support users 102b are given quality/support access rights 108b; the direct users 102c are given direct user access rights 108c; and the indirect users 102d are given indirect user access rights 108d. Other embodiments may include a different number or type of access rights 108.

The access rights 108 within the project team area 104 define how each type of user 102 can interact with the corresponding community development asset 106. As an example, software assets are typically developed in a team environment, and coordination among developers 102a and quality engineers and technical writers 102b is usually done through a common platform. Open source style collaboration may also include asset consumers 102c and 102d. Embodiments of the system described herein address the ability to widen the user community as much as possible to gather important input and contribution through this open collaboration. At the same time, the burden of manually maintaining the project team space 104 and all of the access rights 108 for all of the interested parties, including identifying all of the interested parties, is not placed on the asset owner.

In some embodiments, once the community development asset 106 is published and consumed, the asset providers 102a and 102b and the consumers 102c and 102d are automatically granted corresponding access rights 108 in the project team area 104. Also, in some embodiments, the community associated with a derivative asset (i.e., another community development asset that incorporates the original community development asset) is automatically granted certain access rights 108 in the project team area 104 of the original community development asset 106. For example, indirect consumers 102c (e.g., direct consumers of another asset derived from the original community development asset 106) may be granted indirect user access rights 108d in the project team area 104 for the original community development asset 106. In some embodiments, the communities associated with current users 102 are also granted certain access rights 108 to the community development asset 106. The association of the "community" is derived based on one or more individuals interacting with the system (through download, feature requests, blog entries, etc.). This community association is configurable so that the community associated with some projects is based on a pure social networking framework, while the community associated with other projects is based more on the formal organizational hierarchy. In at least one implementation, granting access rights 108 to the corresponding users is automatic and requires no manual work from the asset provider or the consumers. Additionally, a project team area 104 may be dynamically generated if one does not already exist for the community development asset 106.

Figure 2:
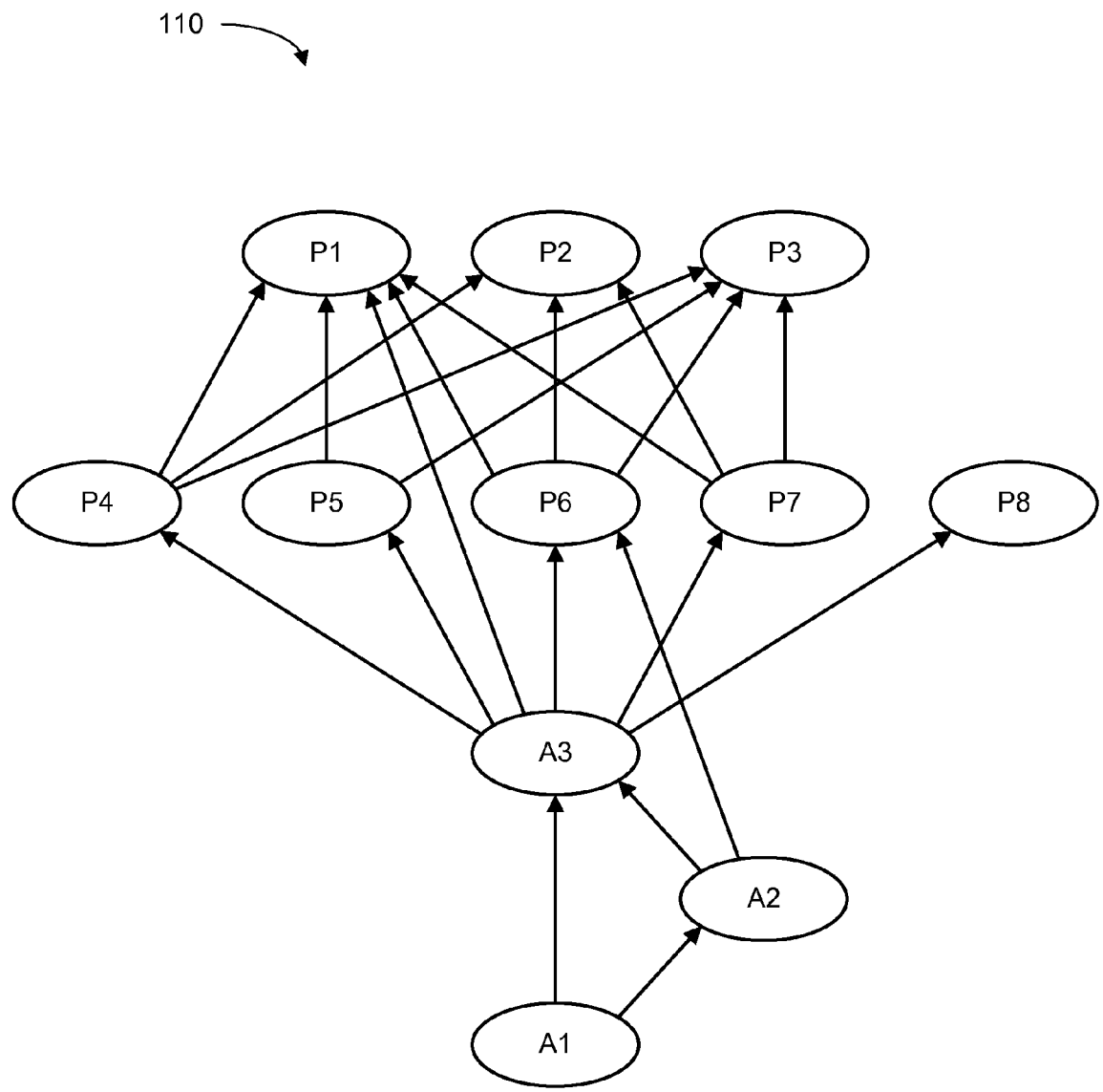
FIG. 2 depicts a schematic diagram of one embodiment of an asset dependency map for a community development asset.

FIG. 2 depicts a schematic diagram of one embodiment of an asset dependency map 110 for a community development asset 106. The asset dependency map 110 also may be referred to as an asset consumption dependency map because it conveys the consumption, or use, of a particular community development asset 106.

In the illustrated asset dependency map 110, there are three community development assets, designated as A1, A2, and A3. The asset dependency map 110 also includes eight product offerings, designated as P1 through P8. One or more of the community development assets is reused by each of the product offerings. In the illustrated embodiment, all of the assets A1-A3 are reused directly or indirectly in all of the product offerings P1-P8. More specifically, asset A1 is incorporated in derivative asset A3, which is directly reused by products P1 and P4-P8. Asset A3 is also indirectly reused in products P2 and P3. Asset A2 also incorporates asset A1 and, in turn, is incorporated in asset A3. Asset A2 is also directly reused by product P6.

In one embodiment, the access rights 108 granted to the users 102 associated with each of the assets A1-A3 depends on the dependencies of each asset to the other assets and to the products. As an example, since asset A1 is reused by all of the other assets and products, the project team area for asset A1 may include access rights 108 for all of the users 102 associated with any of the assets or products within the asset dependency map 110. As another example, the access rights 108 granted to the user communities associated with products P1 and P4-P8 for asset A3 are different from the asset rights 108 granted to the user communities associated with products P2 and P3 because products P2 and P3 do not directly reuse asset A3.

In some embodiments, the specific access rights 108 for each type of user may depend on the consumption level of the user, as well as the participation frequency and activity levels of the user. For example, even though product P3 only indirectly reuses asset A3, a group of users associated with product P3 may be extremely active in contributing to the development of asset A3, either through direct code contributions or evangelizing through blogging. Hence, this group of users associated with product P3 may be granted access rights 108 similar to the access rights 108 granted to a community of direct consumers associated with product P8, which directly reuses asset A3. Additionally, in some embodiments, the access rights 108 granted to at least some of the users may depend on the access rights of other users who are more directly associated with a particular community development asset. By granting access rights according to these examples and principles described herein, all of the parties which consume asset A3, whether directly or indirectly, can openly collaborate and discuss the merits and shortcomings of asset A3 through the project team areas 104 that the users have access to.

Figure 3:
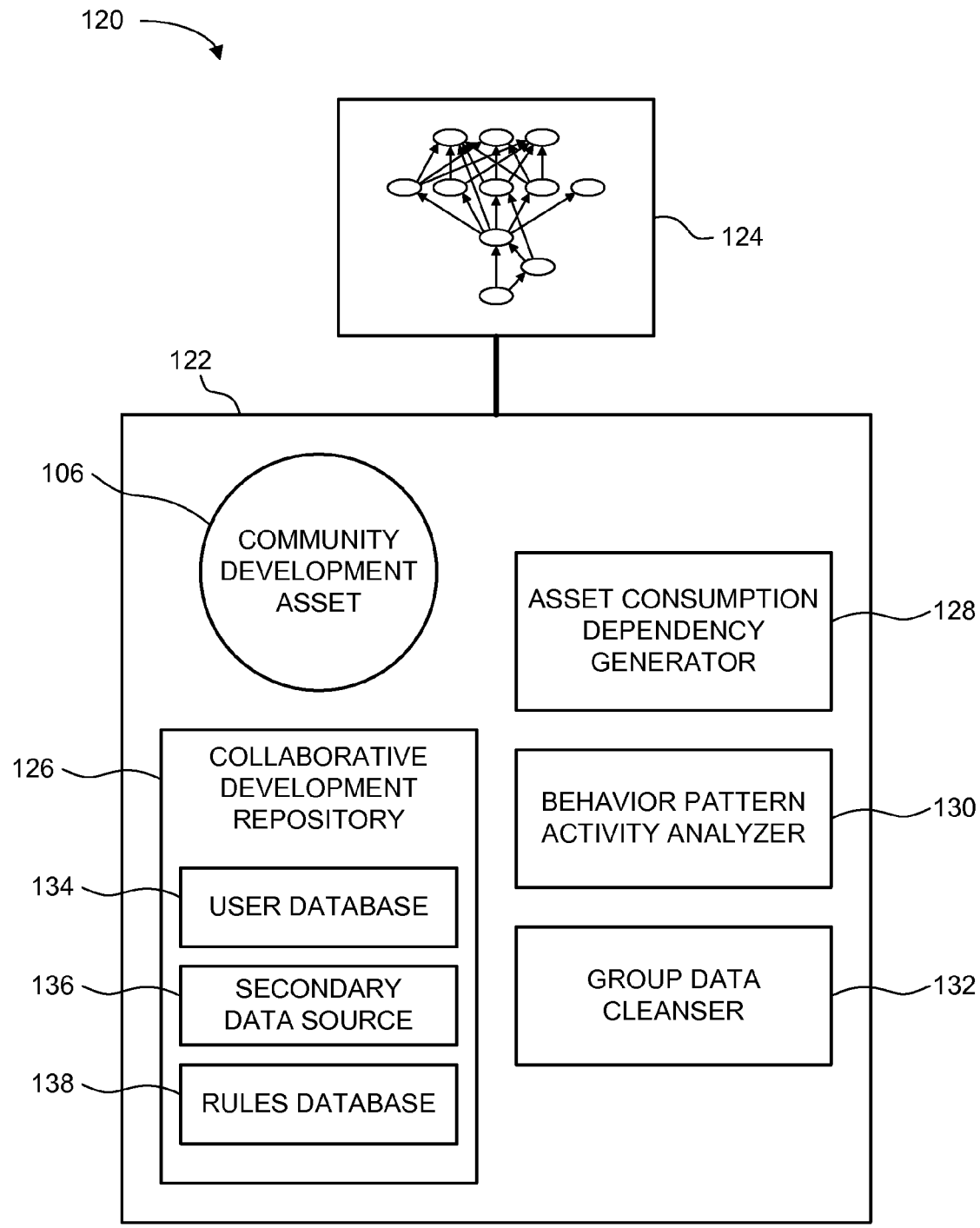
FIG. 3 depicts a schematic diagram of one embodiment of collaborative development system.

FIG. 3 depicts a schematic diagram of one embodiment of collaborative development system 120. Although certain components of the collaborative development system 120 are shown and described herein, other embodiments may implement fewer or more components and provide more or less functionality than the collaborative development system 120 shown in FIG. 3.

The illustrated collaborative development system 120 includes a collaborative development network device 122 and a display device 124 coupled to the collaborative development network device 122. The illustrated collaborative development network device 122 includes the community development asset 106, a collaborative development repository 126, an asset consumption dependency generator 128, a behavior pattern activity analyzer 130, and a group data cleanser 132.

In general, the collaborative development repository 126 stores information for use by the collaborative development network device 122. In one embodiment, the collaborative development repository 126 includes a user database 134 to store information about users within a collaborative development network, including users associated with the community development asset 106. In an embodiment, the user database 134 stores user information that is internal to a company. For example, the user database 134 may store a plurality of user profiles for a plurality of project team areas 104, including a project team area 104 for the community development asset 106. In some embodiments, the user database 134 can be mined to acquire information about the collaborative development network. In some embodiments, information within a user database 134 may be stored remotely or distributed over multiple computers.

The collaborative development repository 126 also includes a secondary database 136 to store secondary information that is not in the user database 134. Exemplary sources within the secondary database 136 may include a weblog (or blog), a wiki, a forum, an email, a chat history, a book mark, or a web feed. Other embodiments may include additional types of sources. Like the user database 134, the sources within the secondary database 136 may be mined to acquire information about the collaborative development network. In some embodiments, at least some of the secondary sources that are mined are stored remotely or distributed over multiple computers. Additionally, some secondary sources such as the internet may be partially or completely external to a company.

The illustrated collaborative development repository 126 also includes a rules database 138. The rules database 138 stores one or more rules that may be used to establish which users within the user database 126 are granted certain access rights 108 to a particular community development asset.

In general, the asset consumption dependency generator 128 creates an asset consumption level and a dependency map. In one embodiment, the asset consumption dependency generator 128 identifies a member of a project team area 104 for a community development asset 106. As explained above, the project team area 104 defines access rights 108 of individuals to the community development asset 106. The asset consumption dependency generator 128 also computes the consumption level of the identified member. The consumption level of the identified member may depend on the relationships depicted by the asset dependency map 110.

In general, the behavior pattern activity analyzer 130 leverages the social network data of a group of users who have similar interests and/or activity patterns to automatically grant certain users access rights 108 to a project team area 104. In one embodiment, the behavior pattern activity analyzer 130 identifies a user (e.g., someone who does not already have access rights) within a collaborative development network associated with an identified member (e.g., someone who does already have access rights) of the project team area 104. The behavior pattern activity analyzer 130 also grants an access right 108 to the identified user to access the community development asset 106 based on a social map dependency between the identified user and the identified member. In some embodiments, the behavior pattern activity analyzer 130 grants the access right 108 to the identified user based on a consumption level of the identified member. In other words, the access rights 108 of a new user may depend on the access rights 108 of an existing user. In one embodiment, the social map dependency between the new and existing users is at least partially graphically depicted by the asset dependency map 110. The behavior pattern activity analyzer 130 also mines user information to identify a plurality of users within the collaborative development network associated with the community development asset 106.

In general, the group data cleanser 132 allows individual access privileges to be revoked base on job changes, or other reasons, without locking out other associated users. In one embodiment, the group data cleanser 132 manages all access rights 108 to the community development asset 106. The group data cleanser 132 also maintains the access right 108 of the identified user subsequent to revocation of the access right 108 of the identified member. Once a member's access right 108 is revoked, the asset consumption dependency generator 128 removes the social map dependency between the identified member whose access right 108 is revoked and the identified user (also referred to as a virtual member of the community) whose access right 108 is maintained. The access rights 108 of virtual members also may go through periodic evaluation and may be updated based on their defined social dependency configuration with the project or their relationship to other members. Part of this evaluation may include calculating and assigning a score to each social relationship, according to simple or complex algorithms known in the art. When the contribution and/or activity level, as indicated by the assigned score, of an identified virtual member falls below a level associated with the normal access rights for that project, the access right 108 of the identified user also may be removed.

The display device 124 is configured to display a social map such as the asset dependency map 110 to illustrate the social map dependency between the identified user and the identified member of the project team area 104.

As one example of possible operations of the collaborative development system 120 shown in FIG. 3, assume person "A" is active within a project team area 104 related to project "X." In particular, person A makes code contributions and provides technical write-ups for project X. Based on person A's level of consumption and access rights for project X, a community associated with person A, but otherwise not associated with project X, may be given certain access rights to project X. For example, the community associated with person A may have the ability to access the project team area 104 for project X in order to provide defect and requirement tracking. The associated community also may have access rights to a corresponding developer forum and mailing lists. If person A is later removed from the project team area 104 for project X, then the access rights granted to the community associated with person A may be retained by certain individuals, even though the initial link—person A—is no longer associated with project X. In this way, the community users previously associated with person A will continue to be able to view and provide input to the project team area 104 for project X. Also, if a new developer joins the core development team, then the community associated with the new developer will automatically have access rights to team areas where the other developers' communities already have access rights.

In another example, once a community development asset 106 is consumed through an automated community tool, the collaborative development system 120 shown in FIG. 3 is able to map out the asset consumption dependency map 110, or tree, that allows the asset owners to quickly identify who is reusing the software asset. That information can then be used to create a collaboration environment for the consuming peers to work with each other directly. Additionally, the collaborative development system 120 facilitates communication and collaboration among consumers of the community development asset 106, whereas traditional collaboration tools do not facilitate such consumer collaboration. In this way, embodiments of the collaborative development system 120 provide a systematic approach to allow collaboration to expand beyond the conventional user community.

Figure 4:
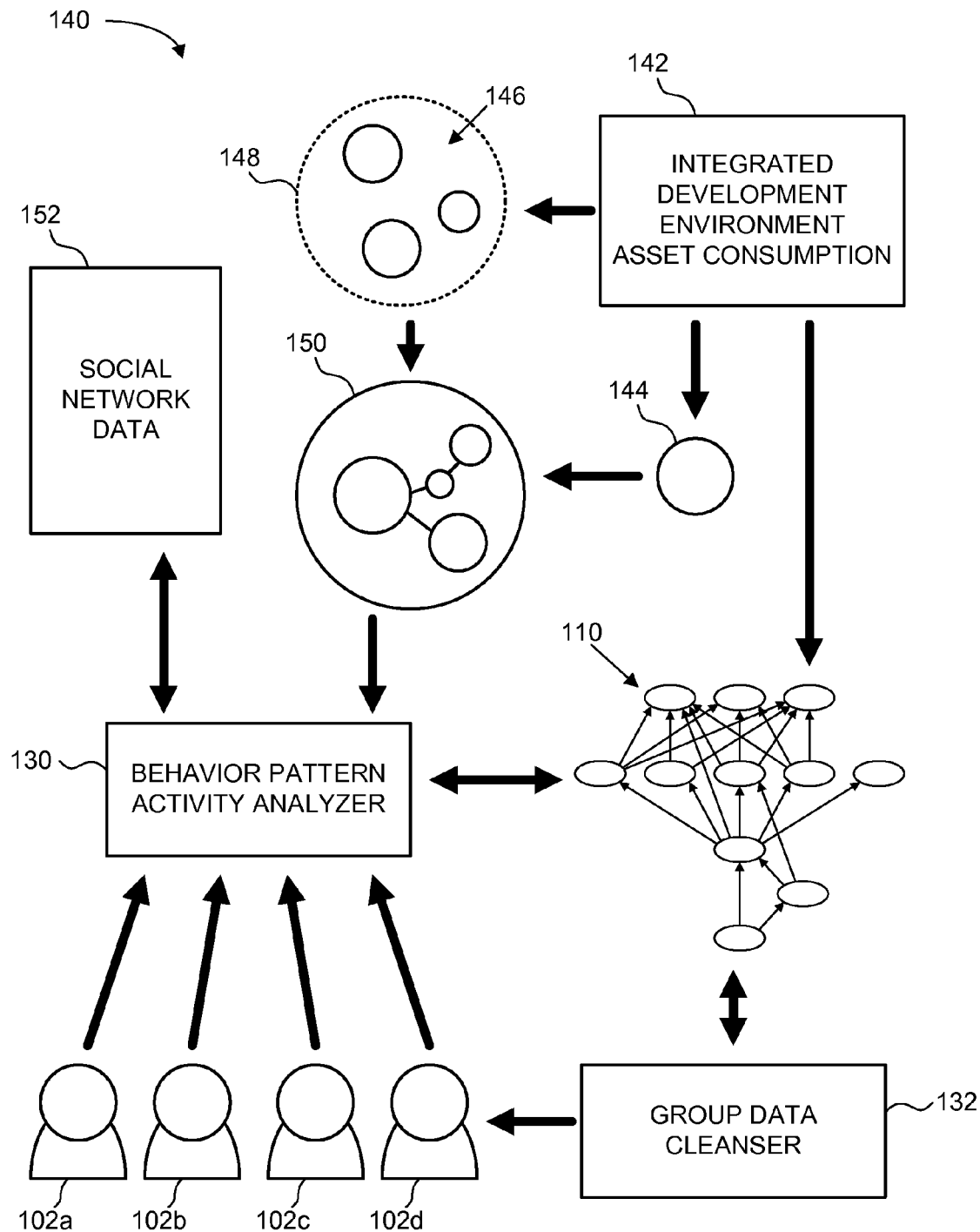
FIG. 4 depicts a schematic process flow diagram of one embodiment of the collaborative development system of FIG. 3.

FIG. 4 depicts a schematic process flow diagram 140 of one embodiment of the collaborative development system 120 of FIG. 3. The illustrated process flow diagram 140 includes interactions among a plurality of users 102a-d, the asset dependency map 110, the behavior pattern activity analyzer 130, and the group data cleanser 132. Additionally, the illustrated process flow diagram 140 includes interactions among an integrated development environment (IDE) asset consumption data 142, an asset provider 144, a community 146 of one or more asset consumers 148, linked asset network communities 150, and social network data 152.

In one embodiment, once a community development asset 106 is consumed, the collaborative development system 120 automatically maps out consumer and provider relationships into the linked asset network communities 150. The asset consumption level dependency map 110 is generated to define a level of involvement that a particular team might have for various community development assets. The behavior pattern activity analyzer 130 is applied based on information gathered from the social network data 152 to further refine the access rights of the identified group. Then, on a continual or periodic basis, the group data cleanser 132 automatically adds or removes individual access to a project team area 104 without disturbing the access rights of other individuals within the community of users. Other embodiments may implement other processes and/or operations.

Figure 5:
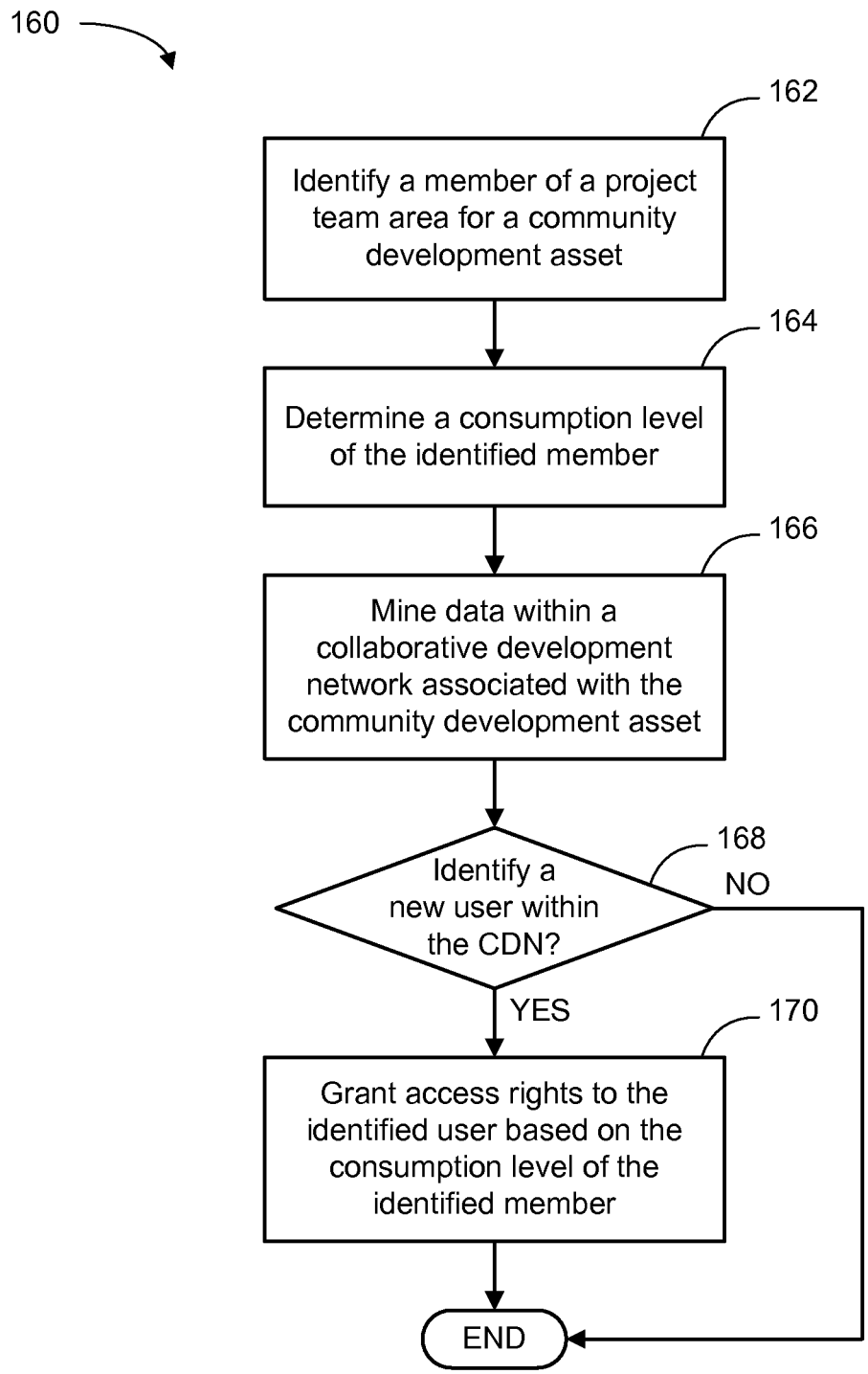
FIG. 5 depicts a schematic flow chart diagram of one embodiment of a method for granting access rights to a collaborative development community.

FIG. 5 depicts a schematic flow chart diagram of one embodiment of a method 160 for granting access rights 108 to a collaborative development community. For ease of explanation, the method 160 is described with reference to the collaborative development system 120 of FIG. 3. However, some embodiments of the method 160 may be implemented with other collaborative development systems.

In one embodiment, the method 160 for granting access rights 108 includes identifying a member of a project team area 104 for a community development asset 106. As explained above, the project team area 104 defines access rights 108 of individuals to the community development asset 106. The method also includes identifying a user within a collaborative development network associated with the identified member of the project team area 104 and granting an access right to the identified user to access the community development asset 106 based on a social map dependency between the identified user and the identified member.

In the illustrated method 160, a member of a project team area 104 for a community development asset 106 is identified 162, and a corresponding consumption level of the identified member is determined 164. Also, data within a collaborative development network associated with the community development asset 106 is mined 166 to identify 168 a new user within the community development network. If a new user is identified, then access rights 108 are granted 170 to the identified user. In some embodiments, the access rights 108 that are granted to the identified user are based on the consumption level of the identified member. In other words, the access rights 108 granted to a new user may depend on the consumption level of an existing member. After the access rights 108 are granted to the new user, or if there are not any new users within the community of the identified member, then the depicted method 160 ends.

Figure 6:
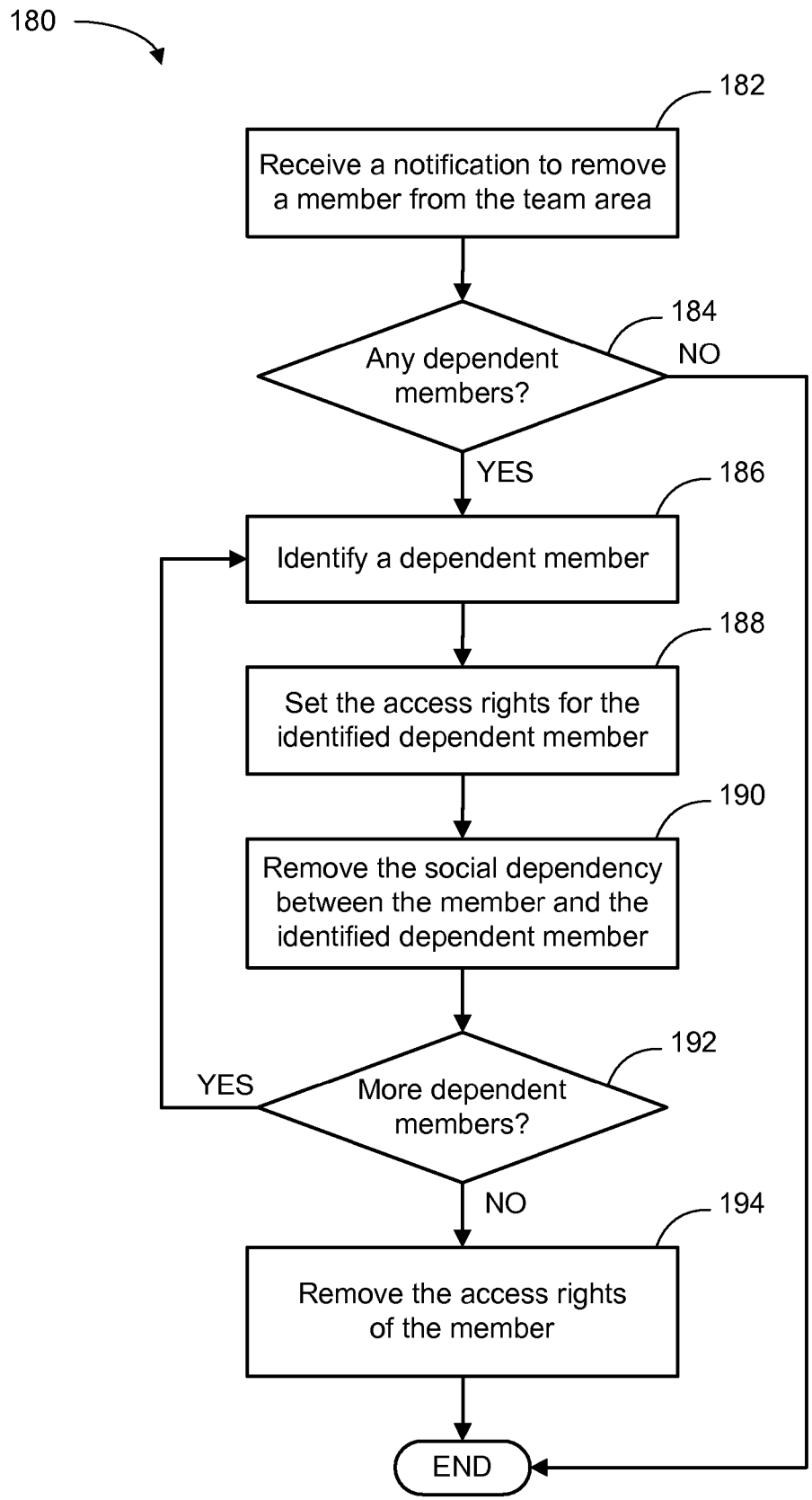
FIG. 6 depicts a schematic flow chart diagram of one embodiment of a method for maintaining access rights to a collaborative development community.

FIG. 6 depicts a schematic flow chart diagram 180 of one embodiment of a method 180 for maintaining access rights to a collaborative development community. For ease of explanation, the method 180 is described with reference to the collaborative development system 120 of FIG. 3. However, some embodiments of the method 180 may be implemented with other collaborative development systems.

In general, the method 180 relates to revoking access rights 108 of identified members whose community status within the asset consumption dependency map 110 changes. The method 180 also related to maintaining the access rights 108 of identified users whose relationship to a particular community development asset may depend, at least in part, on the former status of the identified member whose access rights 108 are revoked.

In the illustrated method 180, the collaborative development system 120 receives 182 a notification to remove a member from a project team area 104. In one embodiment, the group data cleanser 132 generates the notification. In response to the notification, the group data cleanser 132 determines 184 if there are any dependent members whose association with the corresponding community development asset 106 depends on the status of the member to be removed. If so, then the group data cleanser 132 identifies 186 each dependent member and sets 188 the access rights 108 for the identified dependent members. In this way, the access rights 108 of the dependent members may be maintained after the identified member is removed. The group data cleanser 132 then removes 190 the social dependency between the identified member and the identified dependent members. Some or all of these operations may be repeated until it is determined 192 that there are no more members dependent on the identified member. After all of the dependent members have been identified and granted access rights 108 to the project team area 104 associated with the community development asset 106, the group data cleanser 132 removes 194 the access rights 108 of the identified member. The illustrated method 108 then ends.

As described previously, the social map dependency can be configured to rely solely on a formal organizational structure or on a social collaboration between individuals. Therefore, whether to revoke an individual's access rights 108 is also highly dependent upon the social map dependency. For example, if a project operates only based on the organizational structure, then when an individual departs that organization, the access rights 108 of that individual will also be automatically revoked. However, if the access rights 108 of a community are based on the social interaction in the project, then the access rights may or may not be revoked. When an individual moves to a different assignment, but remains active within the community development group of the previous project and maintains social relationships with individuals on the previous project, then the community for the previous project would expand to include this individual's new associated community.

From the foregoing description, it can be understood that embodiments described herein can implement many functions within a collaborative development environment. Some embodiments automatically identify the level of consumption and contribution for an individual as well as his/her associated community for that asset. Some embodiments dynamically generate or reuse a collaboration team area for people with the similar behavior and activities. Some embodiments systematically map out the dependencies of software assets based on usage model. Additionally, the embodiments may map out the consumption community of a software asset. Some embodiments automatically connect the heterogeneous user communities into a collaborative team environment with implicit assigned privilege to a group of associated individuals (i.e., the identified community).

The ability to dynamically connect the heterogeneous consumer community for open collaboration in addition to the existing working relationship between the asset provider and the consumer is also facilitated. The consumer collaboration may foster discussions to improve the quality of the asset as well as reduce adoption difficulty by sharing existing user knowledge.

Furthermore, it should be noted that projects are community objects and hence have relationships with other objects though which access may be derived. This means that if project "X" consumes artifacts from project "Y," then the community associated with project "X" derives some access rights in project "Y." So if a developer is added to project "X," then the developer will derive some level of access to project "Y" because the developer is a part of the community of project "X." Likewise, if an individual joins the community associated with project "X" via some social networking relationship with other members of the community associated with project "X," then the individual also may derive access rights in to project "Y" because of those community relationships.

Additionally, some community objects relate to organizational chart nodes. For example, an exemplary department "Dept BRQA" has some number of community members and a relationship to another exemplary department "Dept COVA." If several members of the "Dept BRQA" community are developers for project "X," then the other community members of "Dept BRQA" derive access rights to project "X" because of the community relationship. Also, the community members of "Dept COVA" also derive access rights to project "X" because of the community relationship between "Dept COVA" and "Dept BRQA." Likewise, both of these communities derive some access rights in project "Y."

In one embodiment, the control points influence how to scale a relationship through the edge paths of the community lattice and how to apportion this to individual community members who themselves have varying relationships with the community. While different embodiments of the scoring process may be implemented, some of which may be very complex, the results of the scoring (threshold) process may be used to drive access rights to a particular project.

It should also be noted that at least some of the operations for the methods 160 and 180 may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to identify a member of the project team area for the community development asset, an operation to identify a user within a collaborative development network associated with the identified member of the project team area, and an operation to grant an access right to the identified user to access the community development asset based on a social map dependency between the identified user and the identified member.

Further embodiments of the computer program product include an operation to revoke an access right of the identified member in response to a change in a social map status of the identified member relative to the community development asset. In some embodiments, the access right of the identified user is maintained subsequent to revocation of the access right of the identified member. Another embodiment includes an operation to grant the access right to the identified user based on a consumption level of the identified member.

Another embodiment of the computer program product includes an operation to mine data within a user database internal to a company. The user database stores a plurality of user profiles for a plurality of project team area. In another embodiment, the operations include an operation to mine data within a secondary data source internal to the company other than the user database. The secondary data source may be a weblog, a wiki, a forum, an email, a chat history, a bookmark, or a web feed. Another embodiment includes an operation to mine data within a secondary data source external to a company. Another embodiment includes an operation to generate and display a social map to illustrate the social map dependency between the identified user and the identified member. In some embodiments, the community development asset is a software asset at least partially developed in a collaborative development environment. Another embodiment includes operations to calculate a score to characterize the social map dependency between the identified user and the identified member and to revoke the access right of the identified user in response to a determination that the calculated score falls below a minimum threshold associated with the community development asset. Other embodiments of the computer program product may include operations to implement additional functionality, as described herein.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable storage medium to store a computer readable program that, when executed on a computer, causes the computer to perform operations to dynamically manage access rights to a project team area for a community development asset of a community development network, the operations comprising:

identify the project team area for the community development asset, wherein the project team area defines access rights of individuals to the community development asset, and restrict access rights to the community development asset to only authorized individuals and isolate the community development asset from unauthorized individuals;

analyze social network data of users within the community development network, wherein social network data comprises activity patterns of the users on a social network;

identify a first association between a first user within the community development network who has no access rights to the community development asset and the community development asset based on a behavior pattern or consumption level of the first user within the community development network and identify a second association between the first user and an existing user of the community development asset based on social network data of the user and existing user; and automatically grant an access right to the first user to access the community development asset based on the first association and the second association and the social network data.

2. The computer program product of claim 1, wherein the granting is further based on an access right of existing user of the community development asset.

3. The computer program product of claim 2, wherein the computer readable program, when executed on the computer, causes the computer to perform an operation to revoke an access right of the existing user in response to a change in social map status of the existing user relative to the community development asset, and to maintain the access right of the identified user subsequent to revocation of the access right of the member.

4. The computer program product of claim 1, wherein the operation to identify a first association further comprises an operation to mine data within a user database internal to a company, wherein the user database stores a plurality of user profiles for a plurality of project team areas.

5. The computer program product of claim 4, wherein the operation to identify a first association further comprises an operation to mine data within a secondary data source internal to the company other than the user database, wherein the secondary data source comprises at least one source out of a weblog, a wiki, a forum, an email, a chat history, a bookmark, and a web feed.

6. The computer program product of claim 1, wherein the operation to identify a first association further comprises an operation to mine data within a secondary data source external to a company.

7. The computer program product of claim 1, wherein the community development asset comprises a software asset at least partially developed in a collaborative development environment.

8. A system comprising:
   a non-transitory computer readable storage medium having instructions stored thereon which, when executed by a computer, cause the computer to execute operations for:
   an asset consumption dependency generator to identify a project team area for a community development asset, the project team area to define access rights of individuals of a community development network to the community development asset, and restrict access rights to the community development asset to only authorized individuals and isolate the community development asset from unauthorized individuals; and
   a behavior pattern activity analyzer coupled to the asset consumption dependency generator, the behavior pattern activity analyzer to analyze social network data of users within the community development network, wherein social network data comprises activity patterns of the users on a social network, to identify a first association between a first user within a collaborative development network who has no access rights to the community development asset and the community development asset based on a behavior pattern or consumption level of the first user within the community development network and identify a second association between the first user and an existing user of the community development asset based on social network data of the first user and the existing user, and to automatically grant an access right to the first user to access the community development asset based on the first association and the second association and the social network data.

9. The system of claim 8, wherein the grant is further based on an access right of existing user of the community development asset.

10. The system of claim 9, further comprising a group data cleanser coupled to the behavior pattern activity analyzer, the group data cleanser to manage all access rights to the community development asset, wherein the group data cleanser is further configured to maintain the access right of the first user subsequent to revocation of the access right of the existing user.

11. The system of claim 8, wherein the behavior pattern activity analyzer is further configured to mine user information to identify a plurality of users within the collaborative development network with the community development asset.

12. A computer-implemented method comprising:
   identifying a project team area stored on a hardware storage device for a community development asset, wherein the project team area defines access rights of individuals of a community development network to the community development asset, and restrict access rights to the community development asset to only authorized individuals and isolate the community development asset from unauthorized individuals;
   analyze social network data of users within the community development network, wherein social network data comprises activity patterns of the users on a social network;
   identifying a first association between a first user within the community development network who has no access rights to the community development asset and the community development asset based on a behavior pattern or consumption level of the user with the community development network and identify a second association between the first user and an existing user of the community development asset based on social network data of the user and existing user; and
   automatically granting an access right to the first user to access the community development asset based on the first association and the second association and the social network data.

13. The method of claim 12, wherein the granting is further based on an access right of existing user of the project team area for the community development asset, the method further comprising:
   revoking an access right of the existing user in response to a change in a social map status of the existing user relative to the community development asset; and
   maintaining the access right of the first user subsequent to revocation of the access right of the existing user.

14. The method of claim 13, further comprising mining user information to identify a plurality of users within the collaborative development network associated with the community development asset.

* * * * *